US011306686B2

(12) United States Patent
Makino et al.

(10) Patent No.: US 11,306,686 B2
(45) Date of Patent: Apr. 19, 2022

(54) FLUID CONTROL VALVE

(71) Applicant: AISAN KOGYO KABUSHIKI KAISHA, Obu (JP)

(72) Inventors: Katsuhiko Makino, Aichi-ken (JP); Yasuhiro Tsuzuki, Aichi-ken (JP)

(73) Assignee: Aisan Kogyo Kabushiki Kaisha, Obu (JP)

(*) Notice: Subject to any disclaimer, the term of this patent is extended or adjusted under 35 U.S.C. 154(b) by 0 days.

(21) Appl. No.: 16/424,699

(22) Filed: May 29, 2019

(65) Prior Publication Data

US 2019/0376473 A1 Dec. 12, 2019

(30) Foreign Application Priority Data

Jun. 6, 2018 (JP) ............................ JP2018-108264

(51) Int. Cl.
*F16K 1/34* (2006.01)
*F02M 25/08* (2006.01)
(Continued)

(52) U.S. Cl.
CPC ........... *F02M 25/0836* (2013.01); *F16K 1/34* (2013.01); *F16K 17/20* (2013.01); *F16K 31/04* (2013.01);
(Continued)

(58) Field of Classification Search
CPC ............. F02M 25/0836; F02M 25/089; F02M 2025/0845; F16K 1/34; F16K 17/20; F16K 31/04; F16K 27/0209; F16K 27/048; Y10T 137/7772; Y10T 137/7773; Y10T 137/7774; Y10T 137/7775; Y10T 137/7776; Y10T 137/7777; Y10T 137/778;
(Continued)

(56) References Cited

U.S. PATENT DOCUMENTS 1,428,928 A * 9/1922 Smith .................. F16K 17/044 137/493.9
1,616,335 A * 2/1927 Rochefort ............. F02M 67/12 239/412
2,500,156 A * 3/1950 Dechant ................. F16K 15/18 137/512.3
3,427,988 A * 2/1969 Schmieman ........... F04B 53/10 417/569

(Continued)

FOREIGN PATENT DOCUMENTS

JP 2015-227723 A 12/2015
JP 2016121790 A 7/2016

OTHER PUBLICATIONS

Japanese Patent Application No. 2018-108264 Notice of Reasons for Refusal dated Sep. 30, 2021 (6 pages).

*Primary Examiner* — Craig J Price
(74) *Attorney, Agent, or Firm* — Conley Rose, P.C.

(57) ABSTRACT

A fluid control valve includes a housing body, a valve member, and a cap. The housing body includes a pipe part and a valve housing part. The valve housing part includes a valve opening, a pair of flat surfaces and an open end. In addition, the valve housing part houses the valve member configured to open and close the valve opening. The valve housing part has a central axis oriented perpendicular to a central axis of the pipe part. The cap closes the open end of the valve housing part. The flat surfaces are formed on opposite sides of a plane including the central axis of the valve housing part and the central axis of the pipe part. Each of the flat surfaces extend perpendicularly to the central axis of the valve housing.

17 Claims, 12 Drawing Sheets

UP LEFT REAR FRONT RIGHT DOWN 63 61 (54) 170 III 57 (74) 173 56 60 (52) 58 (74) III

UP RIGHT LEFT DOWN 54 154 157 136 61a 132 150 159 61b 152 139 67 140 130 138 145 61 (56) 161 134 141 163 145 82 170 143 80 156 164 147 165 170 75 (74) 57a 57 (56) 173

(51) Int. Cl.

*F16K 17/20* (2006.01)
*F16K 31/04* (2006.01)
*F16K 27/02* (2006.01)

(52) U.S. Cl.

CPC ... *F02M 25/089* (2013.01); *F02M 2025/0845* (2013.01); *F16K 27/0209* (2013.01); *Y10T 137/7841* (2015.04)

(58) Field of Classification Search

CPC ............. Y10T 137/60; Y10T 137/6004; Y10T 137/6007; Y10T 137/6011; Y10T 137/6028; Y10T 137/6031; Y10T 137/6065; Y10T 137/6086; Y10T 137/88022; Y10T 137/8803; Y10T 137/88038; Y10T 137/88062; Y10T 137/7841; Y10T 137/7932

USPC ............ 137/493, 493.1, 493.3–493.6, 493.9, 137/614.16, 614.17, 614.18, 614.21; 29/213.1, 243.517

See application file for complete search history.

(56) References Cited

U.S. PATENT DOCUMENTS

| | | | | |
|---|---|---|---|---|
| 3,679,332 | A * | 7/1972 | Yohpe | F04B 53/164 417/503 |
| 6,019,125 | A * | 2/2000 | Reverberi | F04B 53/1027 137/454.6 |
| 7,290,560 | B2 * | 11/2007 | Orr | F04B 53/007 137/454.2 |
| 8,360,094 | B2 * | 1/2013 | Steinbock | E21B 17/085 137/454.6 |
| 10,113,514 | B2 | 10/2018 | Wada | |
| 10,280,874 | B2 * | 5/2019 | Tsuzuki | F02M 25/0836 |
| 10,750,567 | B2 * | 8/2020 | Cao | H04W 36/08 |
| 10,767,773 | B2 * | 9/2020 | Lee | F16K 27/0209 |
| 10,851,904 | B2 * | 12/2020 | Jeon | B60T 8/341 |
| 2003/0197143 | A1 * | 10/2003 | Kai | F02M 25/0836 251/129.17 |
| 2014/0286805 | A1 * | 9/2014 | Dyer | F04B 49/22 417/570 |
| 2015/0147194 | A1 * | 5/2015 | Foote | F04B 53/16 417/53 |
| 2017/0356394 | A1 * | 12/2017 | Murai | F02D 41/0045 |

* cited by examiner

FLUID CONTROL VALVE

CROSS-REFERENCE TO RELATED APPLICATIONS

This application claims priority to Japanese patent application serial number 2018-108264, filed Jun. 6, 2018, which is hereby incorporated herein by reference in its entirety for all purposes.

STATEMENT REGARDING FEDERALLY SPONSORED RESEARCH OR DEVELOPMENT

Not applicable.

BACKGROUND

This disclosure relates generally to fluid control valves.

An evaporative emission control system is mounted on a vehicle such as an automobile. The evaporative emission control system includes a relief valve as a fluid control valve for controlling an internal pressure of a fuel tank within a predetermined range. The fluid control valve is also referred to as a flow control valve.

Japanese Laid-Open Patent Publication No. 2016-121790 discloses a conventional relief valve that is one type of the fluid control valve. The fluid control valve has a housing body, a cap, a valve member, and a spring. The housing body includes a pipe part and a valve housing part. The pipe part forms a flow passage therein. The valve housing part forms a valve chamber for housing the valve member therein. The valve housing part has an open end and a valve opening. The open end is closed by the cap. The valve opening provides fluid communication between the valve chamber and the flow passage. The valve member is configured to open and close the valve opening. The spring is disposed between the valve member and the cap and biases the valve member to the closed position, i.e., toward the valve opening.

During assembly of the fluid control valve, a bottom portion of the valve housing part is put on a workbench or the like such that the open end of the valve housing part is directed upward. In this state, the valve member and the spring are placed in the valve chamber of the valve housing part. Then, the cap is attached to the valve housing part from above by pressing the cap against the biasing force of the spring. At this time, the valve housing part receives a pressing load added to the cap.

A bottom portion of the valve housing is divided into first and second halves in a direction parallel to the axial direction of the pipe part. The first half of the bottom portion is shaped in a flat surface. The second half of the bottom portion is integrated with the pipe part such that the pipe part protrudes downward from the bottom portion. Due to this configuration, during assembling of the fluid control valve, the fluid control valve is put on the workbench such that only the first half of two halves of the bottom portion is supported by the workbench. Thus, the fluid control valve tends to be unstable on the workbench. More specifically, when pressing the cap downward toward the valve housing part, the relief valve can easily incline on the workbench.

BRIEF SUMMARY

In one aspect of this disclosure, a fluid control valve includes a housing body, a valve member, a cap, and a spring. The housing body includes a pipe part and a valve housing part. The pipe part forms a flow passage therein.

The valve housing part has a valve chamber, a valve opening, a pair of flat surfaces, and an open end. The valve housing part has a central axis oriented perpendicular to a central axis of the pipe part. The valve opening provides fluid communication between the valve chamber and the flow passage. The flat surfaces are formed at both sides of a plane including the central axis of the valve housing part and the central axis of the pipe part. Each of the flat surfaces is oriented perpendicular to the central axis of the valve housing. The valve member is housed in the valve chamber and is configured to open and close the valve opening. The cap closes the open end of the valve housing part. The spring is disposed between the valve member and the cap and biases the valve member toward the valve opening.

According to this aspect, each of the flat surfaces can be supported on a workbench during assembling the fluid control valve. Thus, inclination of the valve housing part due to pressing forces on the cap can be suppressed. Therefore, the assembling workability can be improved. In this embodiment, the term "perpendicular" means not only "at an angle of 90° to a given line" but also "at an angle of about 90° to the given line".

Other objects, features and advantage of the present teaching will be readily understood after reading the following detailed description together with the accompanying drawings and the claims.

BRIEF DESCRIPTION OF THE DRAWINGS

For a detailed description of the preferred embodiments of the present teaching, reference will now be made to the accompanying drawings.

DETAILED DESCRIPTION

Figure 1:
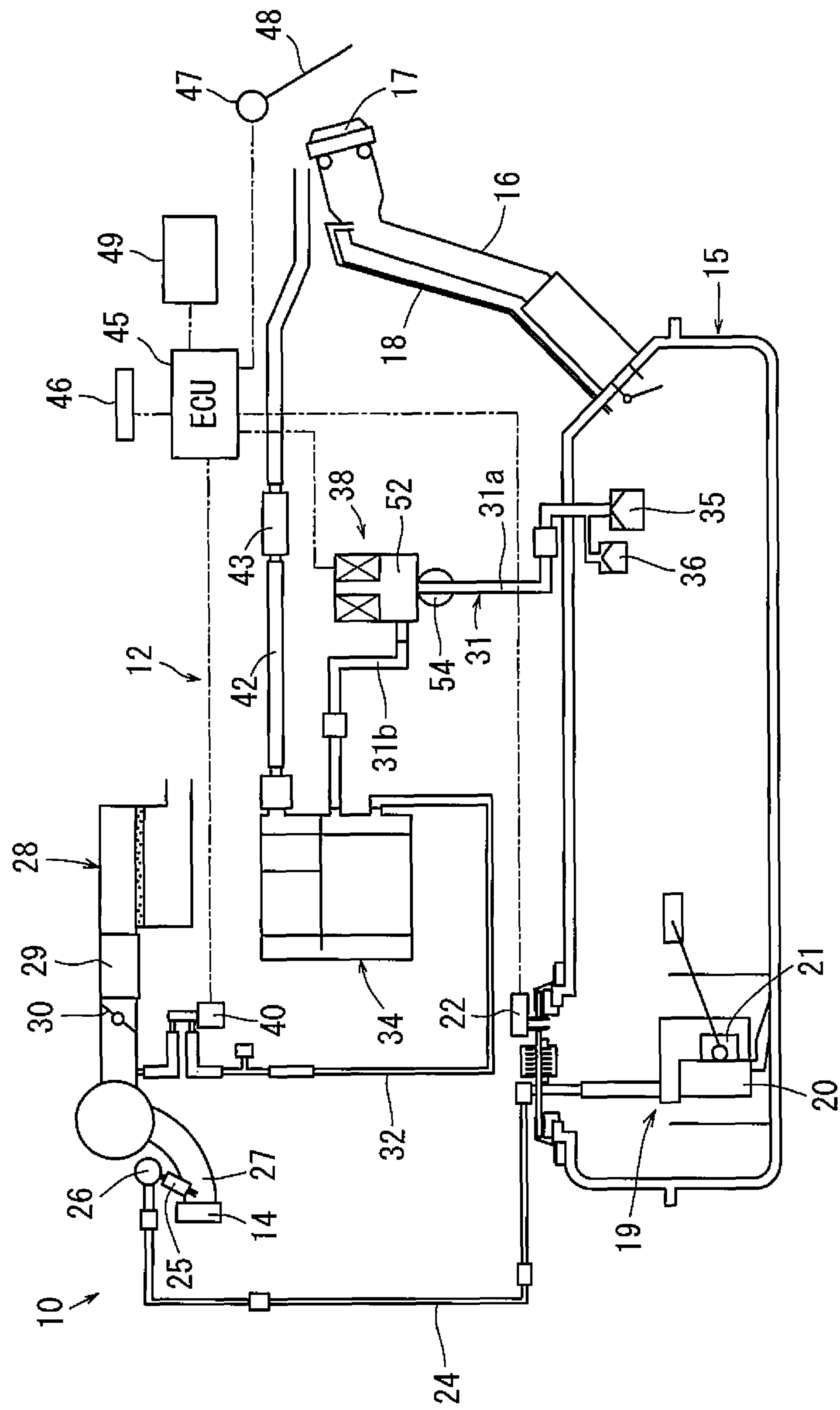
FIG. 1 is schematic view of an evaporative emission control system according to a first embodiment.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different people may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections.

Each of the additional features and teachings disclosed above and below may be utilized separately or in conjunction with other features and teachings to provide improved fluid control valves. Representative examples of the present teachings, which examples utilized many of these additional features and teachings both separately and in conjunction with one another, will now be described in detail with reference to the attached drawings. This detailed description is merely intended to teach people skilled in the art further details for practicing preferred aspects of the present teachings and is not intended to limit the scope of the claimed subject-matter. Only the claims define the scope of the claimed subject-matter. Therefore, combinations of features and steps disclosed in the following detailed description may not be necessary to practice the claimed subject-matter in the broadest sense, and are instead taught merely to particularly describe representative examples of the present teachings. Moreover, various features of the representative examples and the dependent claims may be combined in ways that are not specifically enumerated in order to provide additional useful embodiments of the present teachings.

A first embodiment of the present teaching will be described with reference to the drawings. A fluid control valve in the first embodiment is a relief valve 54 of a closing valve 38. The closing valve 38 is installed in an evaporative emission control system 12 that is mounted on a vehicle having an internal combustion engine, such as automobile. For convenience of explanation, the evaporative emission control system 12 will be described before the closing valve 38 and the relief valve 54.

As shown in FIG. 1, the evaporative emission control system 12 is incorporated in an engine system 10 for a vehicle, such as an automobile. The engine system 10 includes an engine 14 and a fuel tank 15 storing liquid fuel to be supplied to the engine 14. The fuel tank 15 is provided with an inlet pipe 16. The inlet pipe 16 has a filling port at an upper end part thereof and is configured to introduce liquid fuel from the filling port into the fuel tank 15. A tank cap 17 is removably attached to the filling port of the inlet pipe 16. The fuel tank 15 has a breather pipe 18 extending in parallel with the inlet pipe 16. The breather pipe 18 provides fluid communication between an internal space at an upper end part of the inlet pipe 16 and a gas space in the fuel tank 15, in which fuel vapor exists.

The fuel tank 15 houses a fuel supply device 19 therein. The fuel supply device 19 includes a fuel pump 20, a fuel sender gauge 21, and a tank internal pressure sensor 22. The fuel pump 20 suctions the fuel stored in the fuel tank 15, and then pressurizes and discharges it. The fuel sender gauge 21 detects a liquid level of the fuel in the fuel tank 15. In this embodiment, the tank internal pressure sensor 22 detects a tank internal pressure as a relative pressure to the atmospheric pressure. The fuel discharged from the fuel pump 20 is delivered to the engine 14 via a fuel supply passage 24. More specifically, the fuel pump 20 pumps the fuel from the fuel tank 15 into the fuel supply passage 24. The fuel flows through the fuel supply passage 24 toward a delivery pipe 26. Then, the fuel is injected from injectors 25 of the delivery pipe 26 into an air intake passage 27 branched to combustion chambers of the engine 14. The air intake passage 27 is provided with an air cleaner 28, an air flow meter 29, and a throttle valve 30.

The evaporative emission control system 12 includes a vapor passage 31, a purge passage 32, and a canister 34. The vapor passage 31 has an upstream end in fluid communication with the gas space in the fuel tank 15 and a downstream end in fluid communication with the inside of the canister 34. The purge passage 32 has an upstream end in fluid communication with the inside of the canister 34 and a downstream end in fluid communication with the air intake pipe 27 downstream of the throttle valve 30. The canister 34 is filled with an activated carbon that functions as an adsorbent that adsorbs and desorbs the fuel vapor. When the fuel vapor is introduced from the fuel tank 15 into the canister 34 via the vapor passage 31, the fuel vapor is adsorbed on the activated carbon in the canister 34.

In the gas space inside the fuel tank 15, the upstream end of the vapor passage 31 is provided with an on board refueling vapor recovery (ORVR) valve 35 and a fuel cut off valve 36.

The evaporative emission control system 12 also includes the closing valve 38 at the middle of the vapor passage 31. That is, the vapor passage 31 is divided into a tank-side passage 31*a* and a canister-side passage 31*b*. The closing valve 38 is disposed between the tank-side passage 31*a* and the canister-side passage 31*b*. The closing valve 38 includes an electric valve 52 and the relief valve 54. The electric valve 52 is electrically controlled to be open and closed so as to control the amount of gas containing the fuel vapor, which flows through the vapor passage 31. For purposes of further explanation, the gas may also be referred to as "fluid" hereinafter. The electric valve 52 is opened and closed depending on control signals output from an engine control unit (ECU) 45. The relief valve 54 is disposed at a bypass passage 90 bypassing the electric valve 52. The relief valve 54 is configured to open and close so as to maintain the internal pressure of the fuel tank 15 within a predetermined range while the electric valve 52 is closed. The details of the closing valve 38 will be described later.

A purge valve 40 is provided at the middle of the purge passage 32. The degree to which the purge valve 40 opens is controlled depending on the purge amount calculated by the ECU 45. The purge valve 40 includes a stepping motor capable of controlling the valve opening amount by controlling the stroke, i.e., the moving distance of a valve member. The purge valve 40 may include an electromagnetic valve having a solenoid instead of the stepping motor such that the purge valve 40 is closed while power is not supplied and open while power is supplied.

The canister 34 is connected with one end of an atmospheric passage 42. The atmospheric passage 42 has the other end open to the atmosphere. An air filter 43 is disposed at the middle of the atmospheric passage 42.

The ECU 45 is connected to a lid switch 46, a lid opener 47, and a display 49 in addition to the tank internal pressure sensor 22, the electric valve 52 of the closing valve 38, and the purge valve 40. The lid opener 47 is linked to a lid manual opener (not shown) for manually opening a lid 48 that covers the filling port. The lid switch 46 outputs unlock signals to the ECU 45 for unlocking the lid 48. The lid opener 47 is a lock device for the lid 48. The lid opener 47 is configured to unlock the lid 48 when the lid opener 47 receives the unlock signals from the ECU 45 or when the lid manual opener is operated to open the lid 48.

Basic operations of the evaporative emission control system 12 will be described. In a normal condition, the relief valve 54 of the closing valve 38 is closed.

The evaporative emission control system 12 in a state where the vehicle is parked will be described. While the vehicle is parked, the electric valve 52 of the closing valve 38 is kept in the closed state. Thus, the fuel vapor does not flow from the fuel tank 15 into the canister 34. Similarly, the air does not flow from the canister 34 into the fuel tank 15. In this state, the purge valve 40 is held in the closed state. However, when the internal pressure of the fuel tank 15 goes out of a predetermined range in a state where the electric valve 52 is closed, the relief valve 54 of the closing valve 38 opens depending on the internal pressure of the fuel tank 15 so as to allow fluid communication between the fuel tank 15 and the canister 34. Due to this configuration, the internal pressure of the fuel tank 15 can be returned to the predetermined range.

The evaporative emission control system 12 in a state where the vehicle is running will be described. When the predetermined purge condition is met during running, the ECU 45 carries out a purge control for purging the fuel vapor from the canister 34. During the purge control, the ECU 45 controls the purge valve 40 to be open and closed. When the purge valve 40 is opened, the intake negative pressure generated in the engine 14 acts on the canister 34 via the purge passage 32. Thus, the fuel vapor flows from the canister 34 into the air intake passage 27 together with the air introduced through the atmospheric passage 42, and is burnt in the engine 14. The ECU 45 opens the electric valve 52 of the closing valve 38 during purging the fuel vapor from the canister 34. Therefore, the internal pressure of the fuel tank 15 is kept within a range close to the atmospheric pressure.

The evaporative emission control system 12 in a state where fuel is supplied to the vehicle will be described. When the lid switch 46 is operated during parking, the ECU 45 opens the electric valve 52 of the closing valve 38. At this time, if the internal pressure of the fuel tank 15 is higher than the atmospheric pressure, the fuel vapor flows from the fuel tank 15 into the canister 34 via the vapor passage 31 and is trapped by the adsorbent in the canister 34, thereby preventing leakage of the fuel vapor into the atmosphere. This reduces the internal pressure of the fuel tank 15 to a value close to the atmospheric pressure. When the internal pressure of the fuel tank 15 decreases to the value close to the atmospheric pressure, the ECU 45 outputs the unlock signals to the lid opener 47 for unlocking the lid 48. After receiving the unlock signals, the lid opener 47 unlocks the lid 48, so the lid 48 can be opened. After the lid 48 is opened and the tank cap 17 is removed, fuel is supplied to the fuel tank 15. The ECU 45 keeps the electric valve 52 of the closing valve 38 in the open state until the refuel is ended, more specifically until the lid 48 is closed. Due to this configuration, the fuel vapor flows from the fuel tank 15 into the canister 34 via the vapor passage 31 and is adsorbed on the adsorbent in the canister 34 during refueling.

Figure 2:
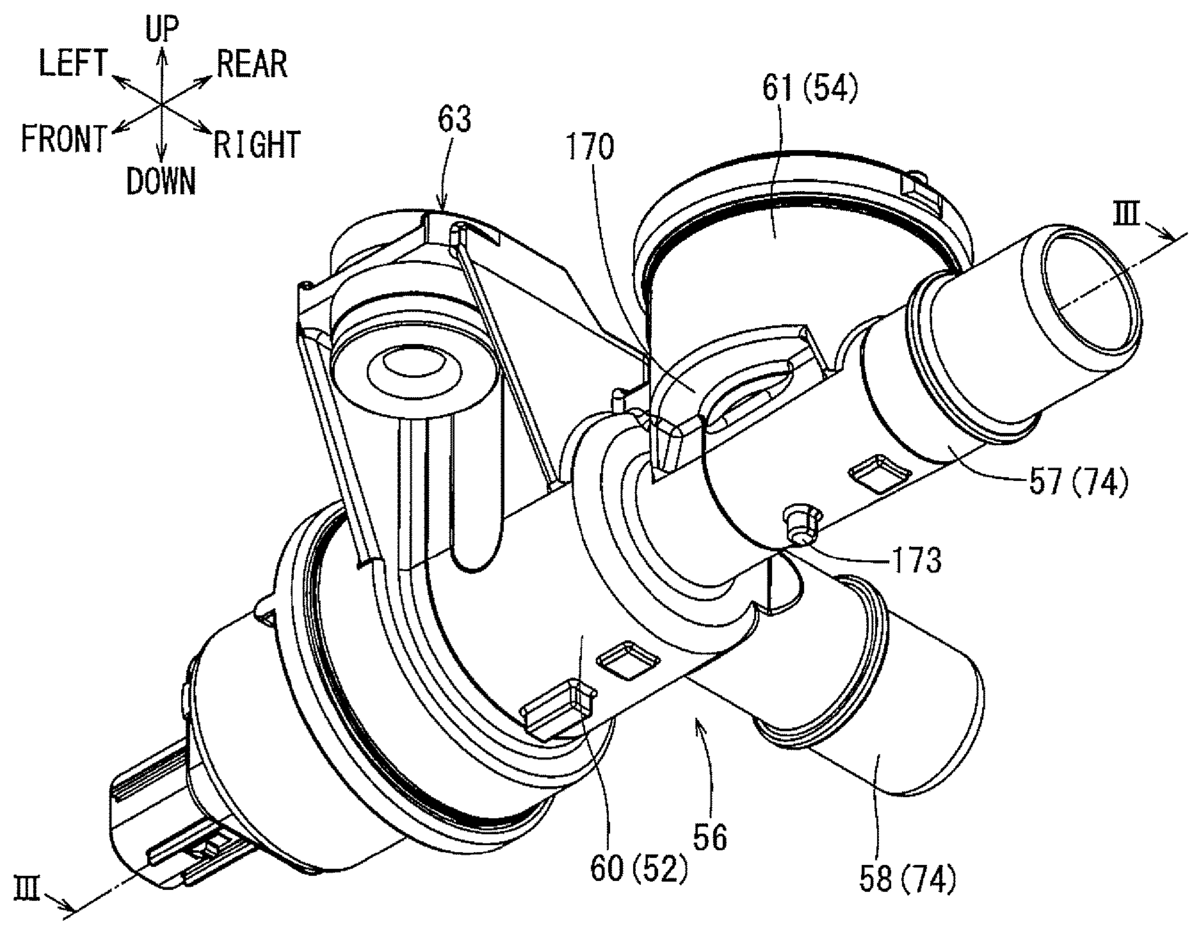
FIG. 2 is a perspective view of a closing valve installed in the evaporative emission control system of FIG. 1.

Next, the closing valve 38 will be described. As shown in FIG. 2, the closing valve 38 includes the electric valve 52, the relief valve 54, and a valve casing 56. The electric valve 52 and the relief valve 54 are disposed within the valve casing 56. The closing valve 38 is usually mounted under a vehicle floor. So, directions of the closing valve 38 in each drawing are based on forward, backward, rightward, leftward, upward and downward directions of the vehicle. However, these directions are not intended to limit installation orientation of the closing valve 38.

Figure 3:
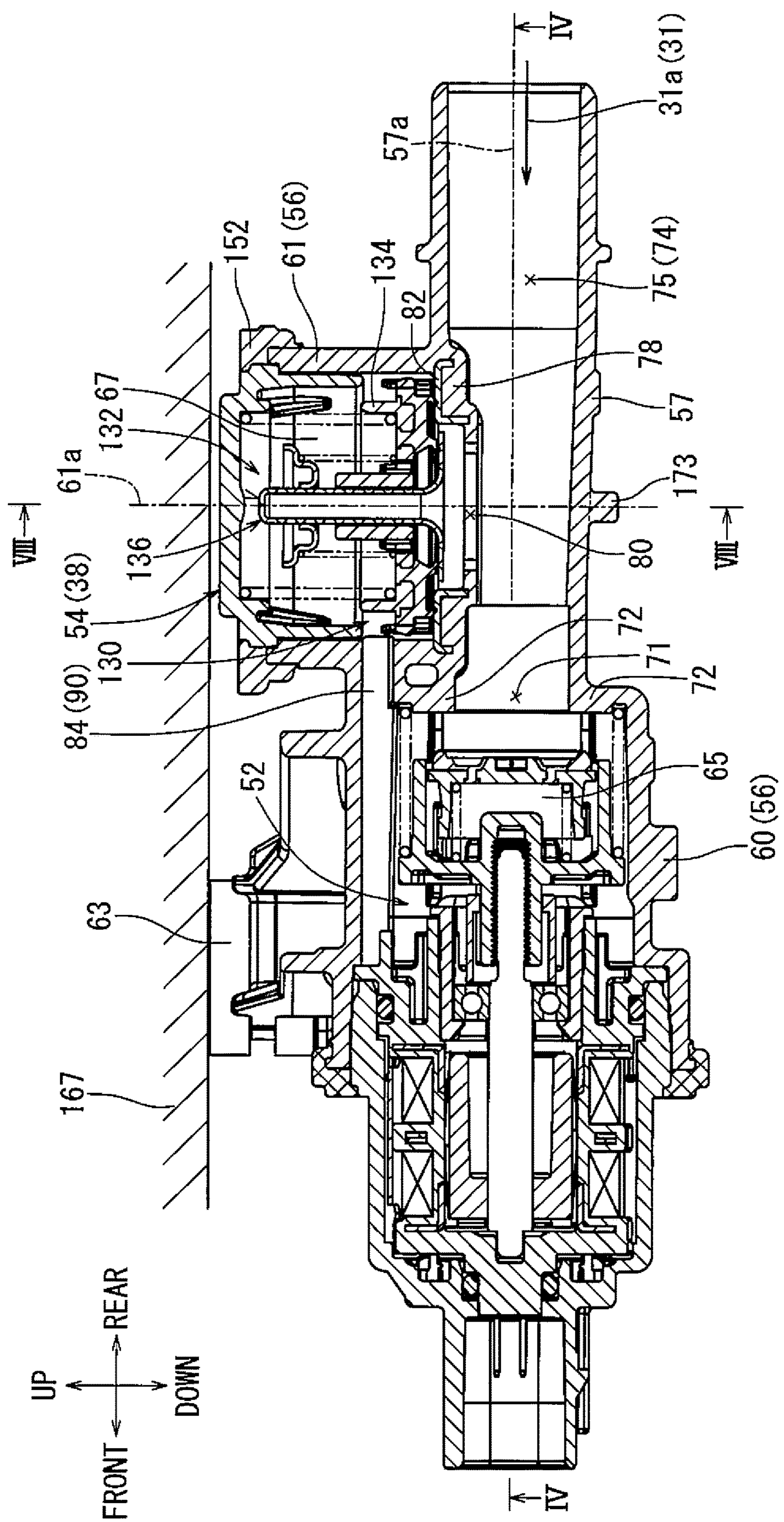
FIG. 3 is a cross-sectional view of the closing valve of FIG. 2 taken in section III-III of FIG. 2, in which the closing valve is attached to a vehicle floor.
Figure 4:
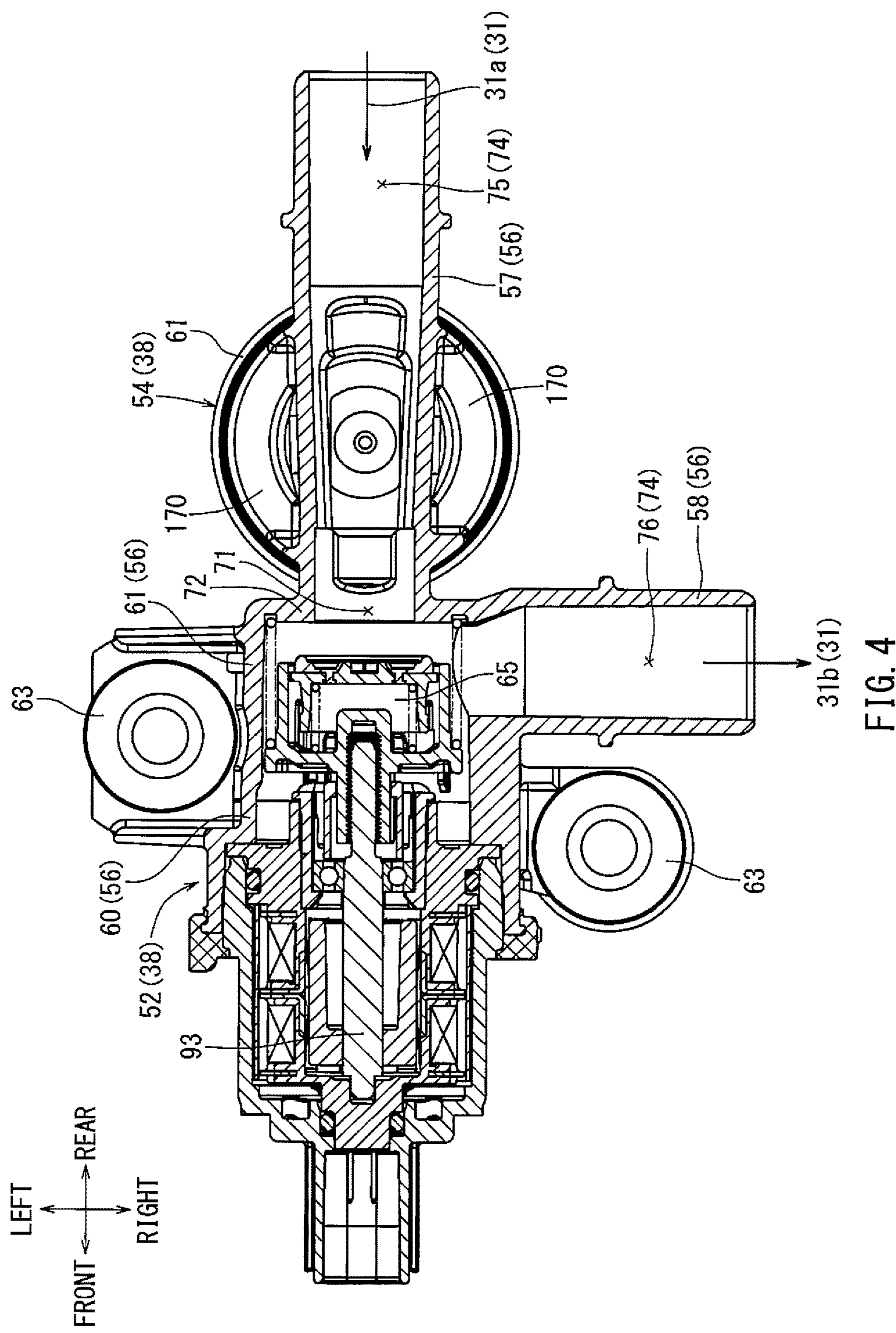
FIG. 4 is a cross-sectional view of the closing valve of FIG. 2 taken in section IV-IV of FIG. 3.

The valve casing 56 is made from a resin material. As shown in FIGS. 3 and 4, the valve casing 56 includes a first cylindrical compartment 60 and a second cylindrical compartment 61. The first cylindrical compartment 60 is a part of the electric valve 52. The second cylindrical compartment 61 is a part of the relief valve 54.

As shown in FIGS. 3 and 4, the first cylindrical compartment 60 is formed in a hollow stepped cylindrical shape with an inner diameter that increases moving toward the front. The first cylindrical compartment 60 defines a first valve chamber 65 at a rear portion thereof. As shown in FIG. 4, the valve casing 56 has a first pipe part 57 and a second pipe part 58. The first pipe part 57 concentrically extends rearward from a rear end of the first cylindrical compartment 60. The second pipe part 57 extends rightward from the rear portion of the first cylindrical compartment 60.

As shown in FIG. 4, the first pipe part 57 is formed in a hollow cylindrical shape defining a first passage 75 therein. A connection between the first cylindrical compartment 60 and the front end of the first pipe part 57 forms a first valve opening 71 that provides fluid communication between the first valve chamber 65 and the first passage 75. The diameter of the first valve opening 71 is slightly smaller than the inner diameter of the first pipe part 57. The rear end portion of the first cylindrical compartment 60 forms the periphery of the first valve opening 71 and defines a first valve seat 72. The second pipe part 58 is also formed in a hollow cylindrical shape defining a second passage 76 in fluid communication with the first valve chamber 65. The diameter of the second passage 76 is substantially same as the first passage 75. The second passage 76 is in fluid communication with the first passage 75 via the first valve chamber 65. Accordingly, the first passage 75, the second passage 76, and a part of the first valve chamber 65 may be described as collectively defining a main passage 74 having an L-shape. The main passage 74 forms a part of the vapor passage 31 in the valve casing 56.

As shown in FIG. 3, the second cylindrical compartment 61 is formed in a hollow cylindrical shape above a front portion of the first pipe part 57. The second cylindrical compartment 61 has a central axis 61*a* oriented perpendicular to a central axis 57*a* of the first pipe part 57. The second cylindrical compartment 61 is positioned right above the first pipe part 57. The second cylindrical compartment 61 defines a second valve chamber 67 therein. As shown in FIG. 4, the second cylindrical compartment 61 has a diameter which is about twice as large as that of the first pipe part 57. As best shown in FIG. 4, the valve casing 56 has a pair of coplanar flat surfaces 170 at a bottom portion of the second cylindrical compartment 61. The flat surfaces 170 are formed at right and left sides of the first pipe part 57. The flat surfaces 170 will be described in more detailed below.

As shown in FIG. 3, the second cylindrical compartment 61 has a concentric stepped part 78 formed in an annular shape that extends radially inward from a lower end of the second cylindrical compartment 61. The stepped part 78 decreases the inner diameter of the second cylindrical compartment 61. A central opening of the stepped part 78 defines a second valve opening 80 that provides fluid communication between the second valve chamber 67 and the first passage 75. On an upper surface of the stepped part 78, a concentrically arranged ring-shaped valve seat 82 is provided. The valve seat 82 is made from a metal plate and is partially seated in the stepped part 78.

As shown in FIG. 3, the valve casing 56 defines therein a communication passage 84 that extends forward from the second cylindrical compartment 61 so as to provide fluid communication between the second valve chamber 67 and the first valve chamber 65. The bypass passage 90 is defined by the second valve opening 80, the second valve chamber 67, the communication passage 84, and the first valve chamber 65. The bypass passage 90 provides fluid communication between the first passage 75 and the second passage 76, and bypasses the first valve opening 71 of the main passage 74.

As shown in FIG. 4, the valve casing 56 has a pair of right and left attachment parts 63 on opposite sides of the first cylindrical compartment 60. The right attachment part 63 is positioned slightly forward from the left attachment part 63. As shown in FIGS. 2 and 3, the attachment parts 63 are integral with an upper portion of the first cylindrical compartment 60. As shown in FIG. 3, the attachment parts 63 are attached to an installation member 167 of the vehicle floor from below by bolts or the like for installing the closing valve 38 on the vehicle.

Figure 5:
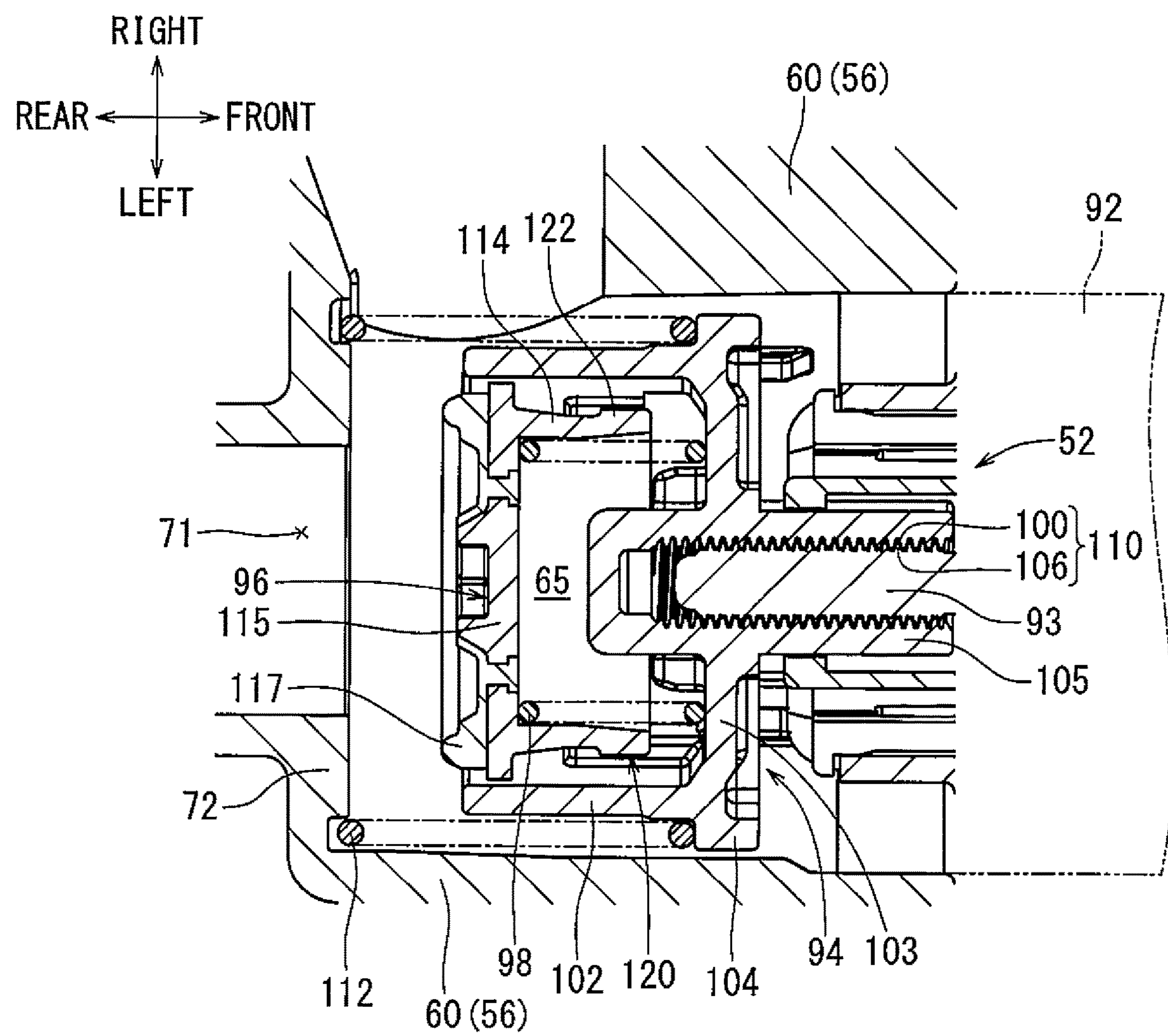
FIG. 5 is an enlarged cross-sectional view of a part of an electric valve of the closing valve of FIG. 2 in an open state.

Next, the structure of the electric valve 52 will be described. As shown in FIG. 3, the electric valve 52 is housed in the first cylindrical compartment 60 of the valve casing 56. As shown in FIG. 5, the electric valve 52 includes an electric motor 92, a valve guide 94, a valve member 96, and a valve spring 98.

The electric motor 92 is a stepping motor. The electric motor 92 is housed in the first cylindrical compartment 60 such that the central axis of the electric motor 92 is oriented in the front-rear direction. The electric motor 92 has an output shaft 93 that can rotate in forward and reverse directions. The output shaft 93 extends in the front-rear direction and is concentrically positioned in the first valve chamber 65 of the first cylindrical compartment 60. The output shaft 93 has a male threaded part 100 at an outer circumferential surface of a rear end portion thereof.

Figure 6:
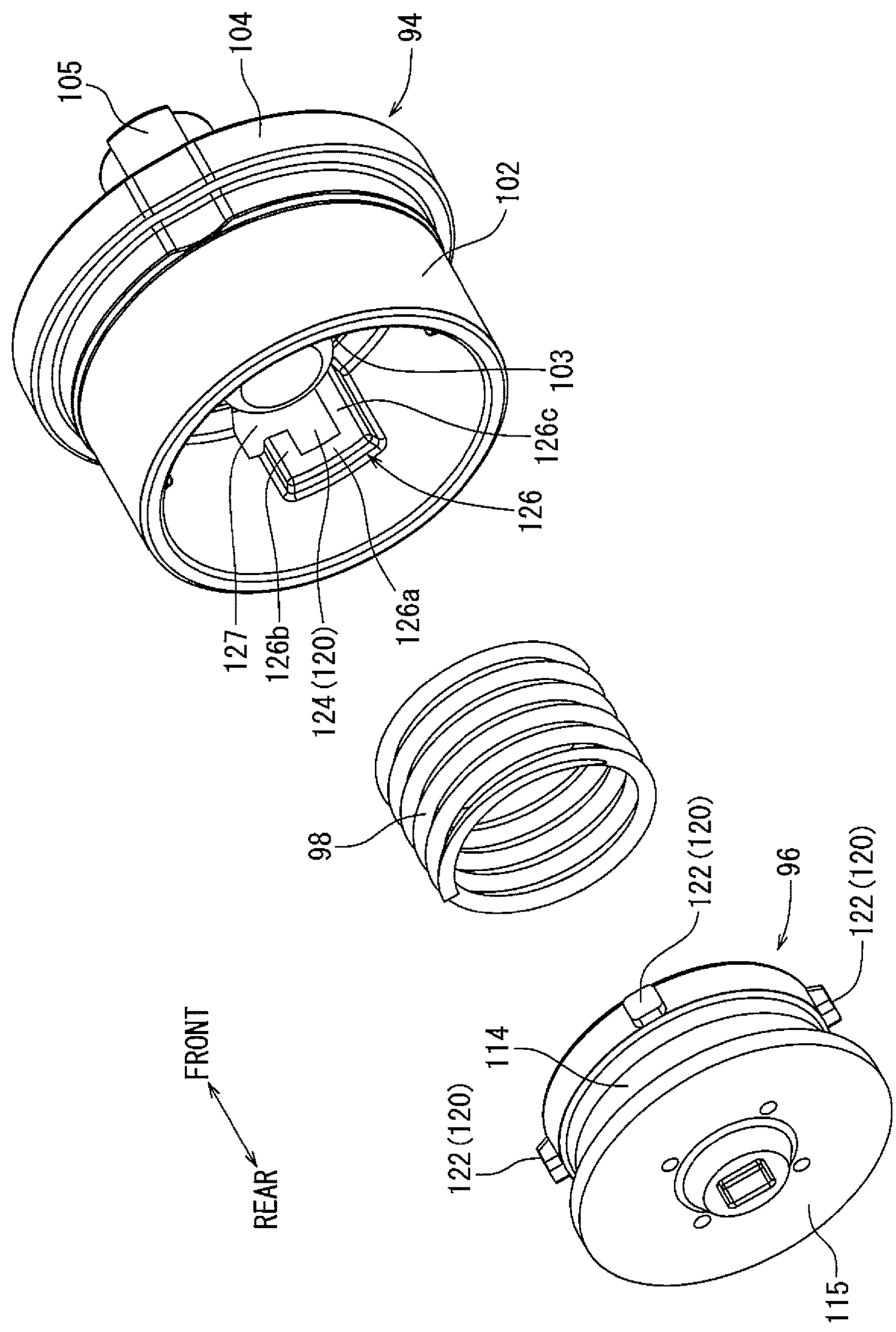
FIG. 6 is a perspective, exploded view of a part of the electric valve of FIG. 5.

As shown in FIG. 6, the valve guide 94 includes a cylindrical part 102 formed in a hollow cylindrical shape and an end part 103 closing a front end of the cylindrical part 102. As shown in FIG. 5, the valve guide 94 has a flange part 104 formed in an annular shape along an outer circumference of the front end of the cylindrical part 102. The flange part 104 has an outer diameter that is larger than the cylindrical part 102 such that a rear surface of the flange part 104 extends radially outward from the outer circumference of the cylindrical part 102. The valve guide 94 has a concentric threaded cylindrical part 105 positioned at the center of the end part 103. The threaded cylindrical part 105 is formed in a hollow cylindrical shape having a closed rear end. The threaded cylindrical part 105 has a female threaded part 106 at an inner circumferential surface thereof.

The valve guide 94 is disposed in the first valve chamber 65 and is movable in the axial direction of the valve guide 94, i.e., in the front-rear direction. The valve guide 94 is supported by a retaining member (not shown) for preventing the valve guide 94 from rotating about its axis. The flange part 104 is positioned apart from an inner circumferential surface of the first cylindrical compartment 60 at a predetermined interval. The female threaded part 106 of the threaded cylindrical part 105 meshes with the male threaded part 100 of the output shaft 93. Due to this configuration, the valve guide 94 moves in the front-rear direction depending on the rotation of the output shaft 93 in the forward and reverse directions. The male threaded part 100 of the output shaft 93 and the female threaded part 106 of the threaded cylindrical part 105 constitute a screw feeder structure 110.

An auxiliary spring 112 is provided between the first valve seat 72 of the valve casing 56 and the flange part 104 of the valve guide 94. In this embodiment, the auxiliary spring 112 is a coil spring and is disposed around the cylindrical part 102. The auxiliary spring 112 biases the valve guide 94 forward to prevent backlash of the screw feeder structure 110. A rear surface of the cylindrical part 102 is directed toward the first valve seat 72 and is configured to come into contact with the first valve seat 72 when the valve guide 94 moves rearward.

As shown in FIG. 5, the valve member 96 includes a side cylindrical part 114 formed in a hollow cylindrical shape and a bottom plate part 115 closing a rear end of the side cylindrical part 114. The bottom plate part 115 is provided with a ring-shaped first seal member 117 at a rear surface of the bottom plate part 115.

As shown in FIG. 5, the valve member 96 is concentrically disposed in the valve guide 94 and is movable in the front-rear direction. The first seal member 117 faces the first valve seat 72 and is configured to come into contact with the first valve seat 72 when the valve member 96 moves rearward. As shown in FIG. 6, the side cylindrical part 114 of the valve member 96 has a plurality (e.g., four) of engagement projections 122 protruding radially outward from an outer circumference of the front end of the side cylindrical part 114. The engagement projections 122 are uniformly circumferentially spaced. The cylindrical part 102 of the valve guide 94 has a plurality (e.g., four) of uniformly circumferentially-spaced engagement grooves 124 formed at an inner circumference of the cylindrical part 102. The engagement grooves 124 are arranged and positioned to align with and engage with the engagement projections 122. The engagement projections 122 and the engagement grooves 124 form a connection assembly or means 120. The connection means 120 moveably couples the valve guide 94 with the valve member 96 such that they can move relative to each other within a predetermined range in the front-rear direction.

As shown in FIG. 6, the cylindrical part 102 of the valve guide 94 has four (one shown in FIG. 6) groove forming projections 126 protruding radially inward from the inner circumference of the cylindrical part 102. The groove forming projections 126 have the same shape, so one of the groove forming projections 126 will be described with the understanding the other groove forming projections 126 are the same. The groove forming projection 126 has a substantial U-shape and includes a bottom part **126*a*, a short side part 126*b*, and a long side part 126*c*. The bottom part 126*a* extends perpendicular to the front-rear direction. The short side part 126 extends forward from one end of the bottom part 126*a*. The long side part 126*c* extends forward from the other end of the bottom part 126*a* to the end part 103. As a result, the groove forming projection 126 defines the engagement groove 124 extending in the front-rear direction and being open radially inward. The groove forming projection 126 has an opening 127 between the short side part 126*b* and the end part 103. During manufacturing, the engagement projection 122** is passed through the opening

127 and into the engagement groove 124, thereby coupling the valve member 96 and the valve guide 94 such that the valve member 96 can move in the axial direction within a predetermined range and cannot rotate in the circumferential direction.

In this embodiment, the valve spring 98 is a coil spring. As shown in FIG. 5, the valve spring 98 is concentrically disposed between the end part 103 of the valve guide 94 and the bottom plate part 115 of the valve member 96. The valve spring 98 biases the valve member 96 rearward, i.e., in the valve closing direction.

Figure 7:
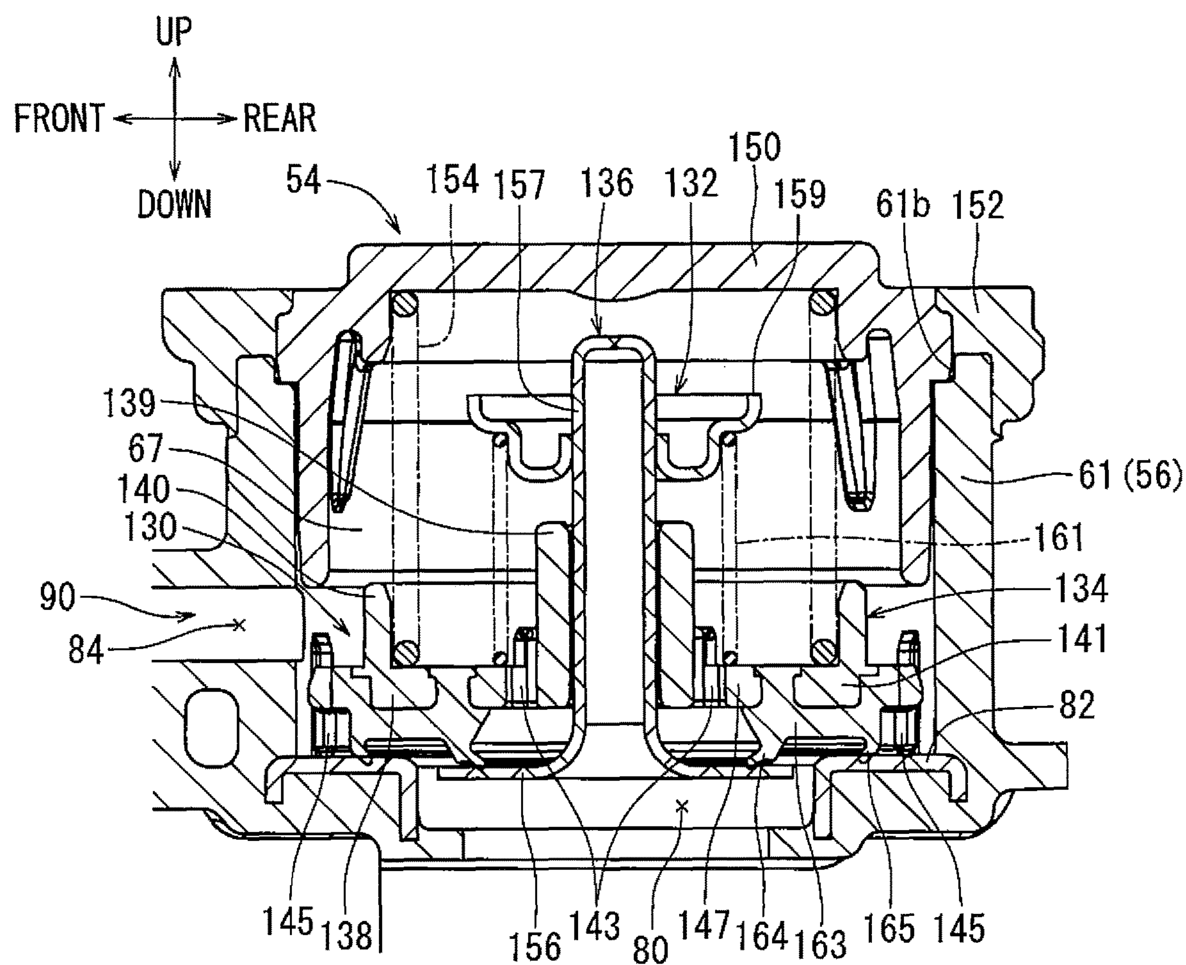
FIG. 7 is a cross-sectional view of a relief valve of the closing valve of FIG. 2.

Next, the relief valve 54 will be described. As shown in FIG. 7, the relief valve 54 includes a positive pressure relief valve structure 130 and a negative pressure relief valve structure 132. Both the positive pressure relief valve structure 130 and the negative pressure relief valve structure 132 shown in FIG. 7 are closed. The relief valve 54 includes the second cylindrical compartment 61 of the valve casing 56 such that the positive pressure relief valve structure 130 and the negative pressure relief valve structure 132 are concentrically positioned in the second valve chamber 67.

The positive pressure relief valve structure 130 has a first valve member 134 concentrically disposed in the second valve chamber 67 and moveable in the vertical direction. The negative pressure relief valve structure 132 has a second valve member 136 concentrically disposed in the second valve chamber 67 and moveable in the vertical direction.

The first valve member 134 includes a first valve plate 138, an inner cylinder part 139, and an outer cylinder part 140. The first valve plate 138 has an annular plate shape. Each of the inner cylinder part 139 and the outer cylinder part 140 are formed in a hollow cylindrical shape. The inner cylinder part 139 is disposed in the outer cylinder part 140 to form a double cylinder structure. The inner cylinder part 139 and the outer cylinder part 140 are concentrically installed upright on the first valve plate 138. An outer circumferential portion of the first valve plate 138 is positioned right above the second valve seat 82. When the first valve member 134 is spaced apart from the second valve seat 82, the second valve opening 80 is open. When the first valve member 134 contacts the second valve seat 82, the second valve opening 80 is closed by the first valve member 134.

The first valve plate 138 has a plurality of communication holes 143 (FIG. 7 shows two of them) extending through the first valve plate 138 in the vertical direction. The communication holes 143 are positioned radially outside the inner cylinder part 139. A lower surface of an outer circumferential edge of the first valve plate 138 is provided with a plurality of uniformly circumferentially-spaced stoppers 145. The stoppers 145 are configured to abut the second valve seat 82 when the first valve member 134 is in the valve closed state. Due to this configuration, the closing valve position of the first valve member 134 is determined. An inner circumferential portion of the first valve plate 138 is a third valve seat 147 for the second valve member 136 of the negative pressure relief valve structure 132.

An upper end of the second cylindrical compartment 61 is provided with a cap 150 and a connection member 152. The cap 150 is made from a resin material and is formed in a hollow cylindrical shape having a closed top. The cap 150 is fitted into and closes the upper end of the second cylindrical compartment 61. The connection member 152 is made from a resin material and is formed in a ring shape. The connection member 152 is integrally bonded with the upper end of the second cylindrical compartment 61 by welding or the like. The connection member 152 is engaged with an outer circumference of the cap 150 so as to prevent the cap 150 from being detached from the second cylindrical compartment 61.

A first spring 154 is concentrically disposed between the cap 150 and the first valve plate 138 of the first valve member 134. In this embodiment, the first spring 154 is a coil spring and biases the first valve member 134 downward, i.e., in the valve closing direction. The first spring 154 is located inside the outer cylinder part 140 of the first valve member 134.

The second valve member 136 includes a second valve plate 156 and a shaft part 157. The second valve plate 156 has an annular plate shape. The shaft part 157 is formed in a cylindrical shape extending upward from an inner circumference of the second valve plate 156. The shaft part 157 is inserted into the inner cylinder part 139 of the first valve member 134 from below. When the second valve plate 156 is spaced apart from the third valve seat 147 of the first valve member 134, the communication holes 143 are open. When the second valve plate 156 abuts the third valve seat 147, the communication holes 143 are closed by the second valve plate 156. An upper end of the shaft part 157 is provided with a ring-shaped spring retainer 159. When the second valve member 136 moves downward, the spring retainer 159 comes into contact with the inner cylinder part 139 of the first valve member 134 so as to restrict a moving distance of the second valve member 136 within a predetermined range. Thus, the maximum opening amount of the second valve member 136 is determined.

A second spring 161 is concentrically disposed between opposite surfaces of the spring retainer 159 and the first valve plate 138 of the first valve member 134. In this embodiment, the second spring 161 is a coil spring. The second spring 161 is located around the inner cylinder part 139 of the first valve member 134. The second spring 161 biases the second valve member 136 upward, i.e., in the valve closing direction. The second spring 161 is concentrically disposed in the first spring 154. The second spring 161 has a smaller coil diameter, a shorter coil length and a smaller diameter wire than the first spring 154. Thus, the biasing force of the second spring 161 is less than that of the first spring 154.

A second valve seal 163 is attached to a lower surface of the first valve plate 138 of the first valve member 134. The second valve seal 163 is made from an elastic material such as rubber. The second valve seal 163 has a ring shape with an inner seal part 164 and an outer seal part 165. Each of the inner seal part 164 and the outer seal part 165 is formed in an annular shape and protrudes downward from a lower surface of the second valve seal 163. The inner seal part 164 concentrically arranged in the outer seal part 165. The inner seal part 164 faces the second valve plate 156 of the second valve member 136. When the second valve member 136 is in the closed state, the second spring 161 biases the second valve member 136 upward, so that the second valve plate 156 elastically abuts, i.e., is in close contact with the inner seal part 164. The outer seal part 165 faces the second valve seat 82 of the valve casing 56. When the first valve member 134 is in the closed state, the first spring 154 biases the first valve member 134 downward, so that the outer seal part 165 elastically abuts, i.e., is in close contact with the second valve seat 82.

Next, operation of the positive pressure relief valve structure 130 will be described. The valve open pressure on the positive pressure side, i.e., the valve open pressure of the positive pressure relief valve structure 130 is determined based on the first spring 154. When the pressure in the upstream passage 75 exceeds the valve open pressure on the positive pressure side, the first valve member 134 moves upward against the biasing force of the first spring 154. As a result, the outer seal part 165 separates from the second valve seat 82, so that the positive pressure relief valve structure 130 is opened.

Operation of the negative pressure relief valve structure 132 will be described. The valve open pressure on the negative pressure side, i.e., the valve open pressure of the negative pressure relief valve structure 132 is determined based on the second spring 161. When the pressure in the upstream passage 75 falls below the valve open pressure on the negative pressure side, the second valve member 136 moves downward against the biasing force of the second spring 161. Consequently, the second valve plate 156 of the second valve member 136 separates from the inner seal part 164, so that the negative pressure relief valve structure 132 is opened.

A mounting state of the closing valve 38 on the vehicle will be described. As shown in FIG. 1, the closing valve 38 is combined with the vapor passage 31 of the evaporative emission control system 12 that is installed on the vehicle (not shown). More specifically, as shown in FIG. 4, the first pipe part 57 of the valve casing 56 is connected with the tank-side passage 31*a* of the vapor passage 31. The second pipe part 58 is connected with the canister-side passage 31*b* of the vapor passage 31. As a result, the tank-side passage 31*a* is in fluid communication with the canister-side passage 31*b* via the main passage 74 of the valve casing 56. Thus, the main passage 74 forms a part of the vapor passage 31. As shown in FIG. 3, the attachment parts 63 are fixed to the installation member 167 formed below the vehicle floor by bolts or the like. Thus, the closing valve 38 is mounted on the vehicle such that the axis of the relief valve 54 is oriented in the vertical direction. In this state, the second valve opening 80 of the relief valve 54 is positioned above the main passage 74, i.e., the first passage 75 formed in the first pipe part 57.

Next, operation of the electric valve 52 of the closing valve 38 will be described. The electric valve 52 is operated while the positive pressure relief valve structure 130 and the negative pressure relief valve structure 132 of the relief valve 54 are in the closed state.

In the valve open state of the electric valve 52, as shown in FIG. 5, the valve guide 94 and the valve member 96 containing the first seal member 117 are spaced apart from the first valve seat 72 of the first cylindrical compartment 60. The valve spring 98 biases the valve member 96 rearward such that the engagement projections 122 of the valve member 96 contact the bottom parts 126*a* of the groove forming projections 126 of the valve guide 94.

When the ECU 45 drives the electric motor 92, the valve guide 94 and the valve member 96 are moved in the front-rear direction by the screw feeder structure 110, thereby allowing the distance of the valve member 96 from the first valve seat 72 to be controlled, i.e., the valve opening amount can be controlled. Even if the electric motor 92 is turned off in a state where the electric valve 52 is in the valve open state, the valve open state can be maintained due to detent torque of the electric motor 92, the lead angle of the screw feeder structure 110 or the like.

While the electric valve 52 is open, the main passage 74 is in the fluid communication state. That is, as shown in FIG. 4, the first passage 75 connected with the tank-side passage 31*a* is in fluid communication with the second passage 76 connected with the canister-side passage 31*b*.

Next, the closing operation of the electric valve 52 will be described. In the open state of the electric valve 52, when the electric motor 92 is operated to open the electric valve 52, the output shaft 93 is rotated in the valve closing direction. Then, the valve guide 94 and the valve member 96 are moved rearward due to action of the screw feeder structure 110. When the valve member 96, and more specifically the first seal member 117, comes into contact with the first valve seat 72, rear movement of the valve member 96 is prevented. Subsequently, the valve guide 94 moves rearward furthermore. Thus, the bottom parts 126*a* of the groove forming projection 126 of the valve guide 94 moves rearward relative to the engagement projections 122 of the valve member 96, so that the connection between the valve guide 94 and the valve member 96 by the connection means 120 comes loose.

Then, when the cylindrical part 102 of the valve guide 94 contacts or is adjacent to the first valve seat 72 of the valve casing 56, the ECU 45 stops the electric motor 92. This state is the valve closed state of the electric valve 52. Here, the valve guide 94 may be adjacent to first valve seat 72 by moving the valve guide 94 rearward to contact the first valve seat 72 and then moving the valve guide 94 in the valve opening direction by a predetermined distance.

Next, the valve closed state of the electric valve 52 will be described. In this state, the valve member 96 is elastically held in contact with the first valve seat 72 of the valve casing 56 by the biasing force of the valve spring 98. The first seal member 117 of the valve member 96 sealingly contacts the first valve seat 72. Even if the electric motor 92 is turned off in the valve closed state of the electric valve 52, the closed state can be kept due to the detent torque of the electric motor 92, the lead angle of the screw feeder structure 110 or the like.

Next, the valve opening operation of the electric valve 52 will be described. In the closed state of the electric valve 52, when the electric valve 92 is operated to open the electric valve 52, the output shaft 93 is rotated in the valve opening direction. Then, the valve guide 94 is moved forward, i.e., in the valve opening direction due to action of the screw feeder structure 110, so that the connection between the valve guide 94 and the valve guide 96 by the connection means 120 becomes firm. More specifically, when the valve guide 94 moves forward, the valve spring 98 and the auxiliary spring 112 extend due to their elastic restoring forces. Due to the extension of the valve spring 98, the engagement projections 122 of the valve member 96 move rearward in the engagement grooves 124 relative to the groove forming projections 126 of the valve guide 94. Then, when the engagement projections 122 contact the bottom parts 126*a* of the groove forming projections 126, the connection between the valve guide 94 and the valve guide 96 by the connection means 120 becomes firm to prevent the valve guide 94 from being apart from the valve member 96 furthermore. Subsequently, when the valve guide 94 and the valve member 96 are moved forward furthermore, the auxiliary spring 112 extends due to its elastic restoring force. Thus, the valve member 96, and more specifically the first seal member 117, separates from the first valve seat 72 such that the electric valve 52 transitions to the valve open state.

Next, operation of the relief valve 54 of the closing valve 38 will be described. Each of the positive pressure relief valve structure 130 and the negative pressure relief valve structure 132 is opened in a state where the electric valve 52 is in the closed state.

When the internal pressure of the fuel tank 15 fluidly communicated with the upstream passage 75 exceeds the valve open pressure of the positive pressure relief valve structure 130, the positive pressure relief valve 130 is opened. Specifically, when the internal pressure of upstream passage 75 exceeds the valve open pressure, the first valve member 134 of the positive pressure relief valve structure 130 is moved upward due to the internal pressure such that the positive pressure relief valve structure 130 transitions open. Thus, the first passage 75 is in fluid communication with the second valve chamber 67, so that the first passage 75 is in fluid communication with the second passage 76 via the bypass passage 90. Therefore, the fluid flows from the fuel tank 15 to the canister 34 via the first passage 75, the bypass passage 90 and the second passage 76. As a result, the internal pressure of the fuel tank 15 can be decreased.

On the other hand, when the internal pressure of the fuel tank 15 connected with the first passage 75 falls below the valve open pressure of the negative pressure relief valve structure 132, the negative pressure relief valve structure 132 is opened. Specifically, when the internal pressure of the first passage 75 falls below the valve open pressure, the second valve member 136 is moved downward by the internal pressure such that the negative pressure relief valve structure 132 transitions open. Thus, the first passage 75 is in fluid communication with the second valve chamber 67, so that the first passage 75 is in fluid communication with the second passage 76 via the bypass passage 90. Therefore, the fluid flows from the canister 34 to the fuel tank 15 via the second passage 76, the bypass passage 90 and the first passage 75. As a result, the internal pressure of the fuel tank 15 can be increased.

Figure 8:
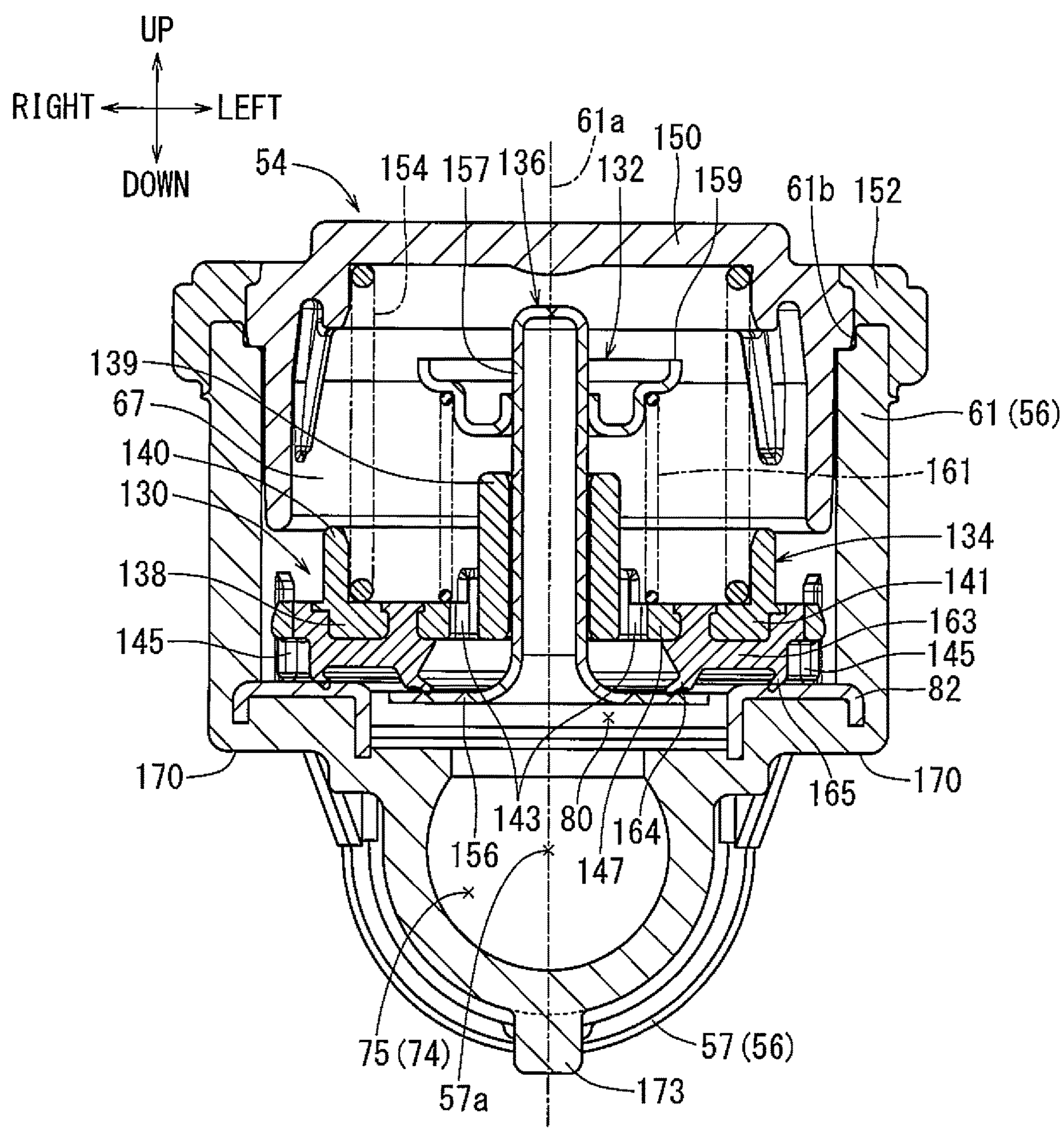
FIG. 8 is a cross-sectional view of the closing valve of FIG. 2 taken in section VIII-VIII of FIG. 3.

Next, structures for improving assembling workability of the relief valve 54 will be described. As shown in FIG. 8 and described above, the relief valve 54 has the flat surfaces 170 and a projection 173. The flat surfaces 170 are formed at the lower surface of the second cylindrical compartment 61 of the valve casing 56. The projection 173 is formed at a lower surface of the first pipe part 57 of the valve casing 56. In this disclosure, the valve casing 56 corresponds to "housing body". The first pipe part 57 corresponds to "pipe part". The first passage 75 in the first pipe part 57 corresponds to "flow passage". The relief valve 54 corresponds to "fluid control valve". The second cylindrical compartment 61 corresponds to "valve housing part". The second valve chamber 67 corresponds to "valve chamber". The second valve opening 80 corresponds to "valve opening". The first valve member 134 corresponds to "valve member". The first spring 154 corresponds to "spring".

As shown in FIG. 3, the second cylindrical compartment 61 is formed in a hollow cylindrical shape and is disposed on an upper portion of a front half of the first pipe part 57. As shown in FIG. 8, the second cylindrical compartment 61 has the central axis 61*a* extending in the vertical direction and an upper end 61*b* forming the open top of the second cylindrical compartment 61. As shown in FIG. 3, the first pipe part 57 has the central axis 57*a* extending in the front-rear direction such that the central axis 57*a* is oriented perpendicular to the central axis 61*a* of the second cylindrical compartment 61.

As shown in FIG. 8, the flat surfaces 170 are the bottom part of the second cylindrical compartment 61 and lower surfaces of the flat surfaces 170 extend along a plane oriented perpendicular to the central axis 61*a* of the second cylindrical compartment 61. The flat surfaces 170 are formed on opposite sides of a plane containing the central axis 61*a* of the second cylindrical compartment 61 and the central axis 57*a* of the first pipe part 57 (i.e., the plane extending along section III-III of FIG. 2 that is depicted in FIG. 3). More specifically, the second cylindrical compartment 61 has the pair of right and left flat surfaces 170 in a symmetric manner.

As shown in FIG. 8, the second cylindrical compartment 61 is shaped to house some components including the first valve member 134, the second valve member 136, and the first spring 154 in the second valve chamber 67. The upper open end of the second cylindrical compartment 61 is closed by attaching the cap 150 to the upper end 61*b* of the second cylindrical compartment 61 from above. The relief valve 54 is provided with the connection member 152 made from a resin material. The connection member 152 is formed in a ring shape covering both an outer circumference of the cap 150 and an outer circumference of the upper end 61*b* of the second cylindrical compartment 61. The connection member 152 prevents the cap 150 from separating from the second cylindrical compartment 61.

As shown in FIGS. 2 and 3, the projection 173 is formed in a short cylindrical shape protruding downward from a bottom of the first pipe part 57. As shown in FIGS. 3 and 8, the projection 173 extends along the central axis 61*a* of the second cylindrical compartment 61.

Figure 9:
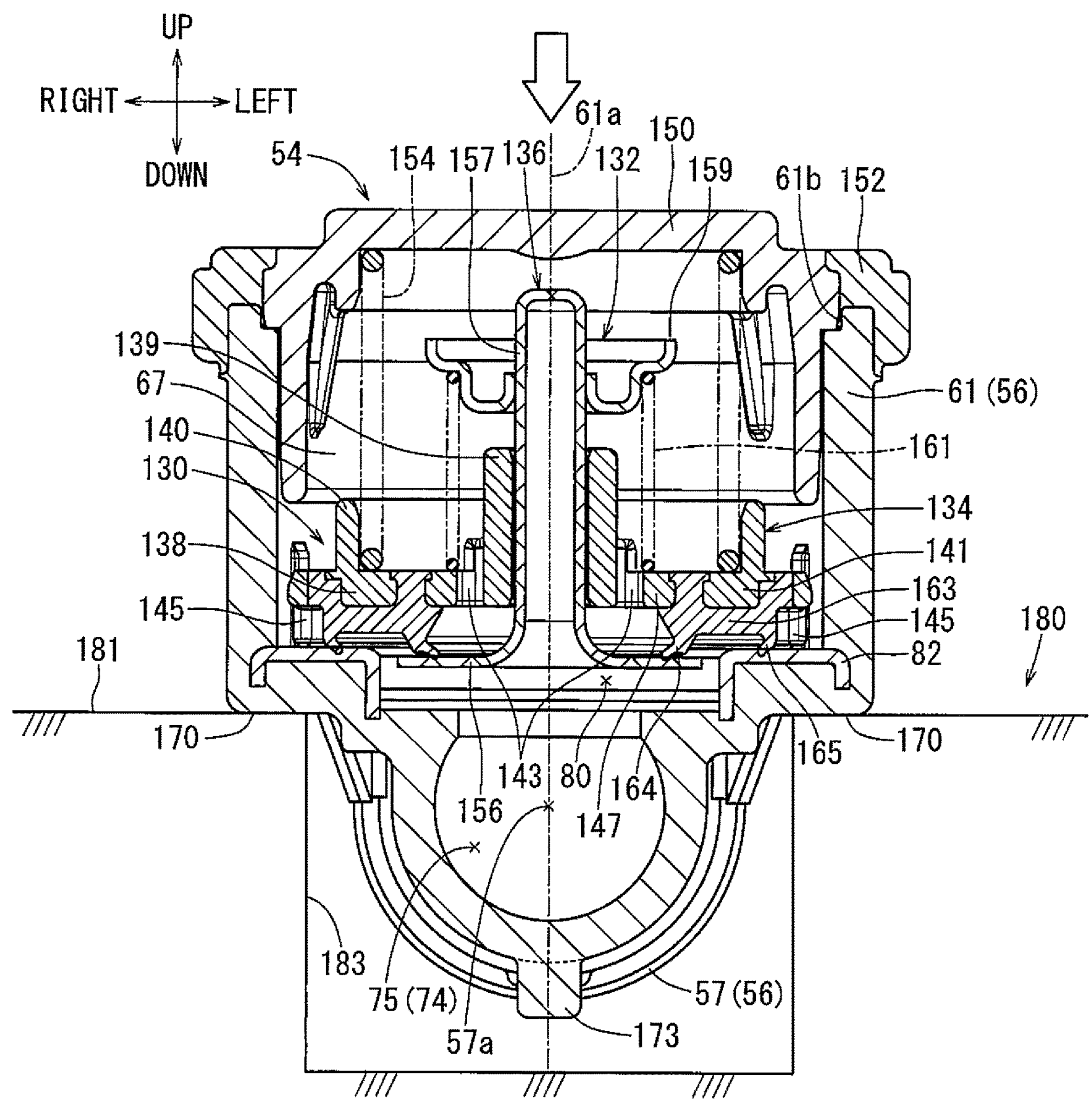
FIG. 9 is a cross-sectional view of the relief valve of FIG. 2 set on a workbench.

As shown in FIG. 9, during the attachment process of the cap 150 to the upper end 61*b* of the second cylindrical compartment 61, it is necessary to press the cap 150 downward (see white arrow in FIG. 9) against the biasing force of the first spring 154. The biasing force of the first spring 154 is relatively strong, so that it is preferred to use a workbench 180 to stably support the relief valve 54 during the attachment process of the cap 150.

The workbench 180 is shown in FIG. 9. The workbench 180 has an upper part 181 and a groove part 183. The upper part 181 has an upper surface extending horizontally. The groove part 183 is recessed from the upper surface of the upper part 181 to extend in the front-rear direction. The groove part 183 is positioned at a central portion of the upper part 181 in the right-left direction. The groove part 183 is formed to have a square shape in the cross-section to receive the part of the first pipe part 57 extending below the flat surfaces 170 therein.

During assembling the relief valve 54, the flat surfaces 170 of the second cylindrical compartment 61 are mounted on the upper part 181 of the workbench 180 such that the part of the first pipe part 57 is disposed in the groove part 183 of the workbench 180. Thus, each of the flat surfaces 170 can be supported by the upper part 181 of the workbench 180.

In this state, internal components of the relief valve 54 are placed in the second valve chamber 67, and then the cap 150 is attached to the upper end 61*b* of the second cylindrical compartment 61 against the biasing force of the first spring 154. At this time, the second cylindrical compartment 61 receives the pressing force applied to the cap 150. Each of the flat surfaces 170 is stably supported by the upper part 181 of the workbench 180, so that inclination of the second cylindrical compartment 61 by pressing force on the cap 150 can be reduced or avoided.

The connection member 152 is formed by secondary molding of a resin material along the whole peripheries of the second cylindrical compartment 61 and the cap 150. The connection member 152 retains connection between the second cylindrical compartment 61 and the cap 150 in a non-removable manner. In this disclosure, the connection member 152 corresponds to "secondary molded member". Each of the valve casing 56 and the cap 150 corresponds to "primary molded member".

Figure 10:
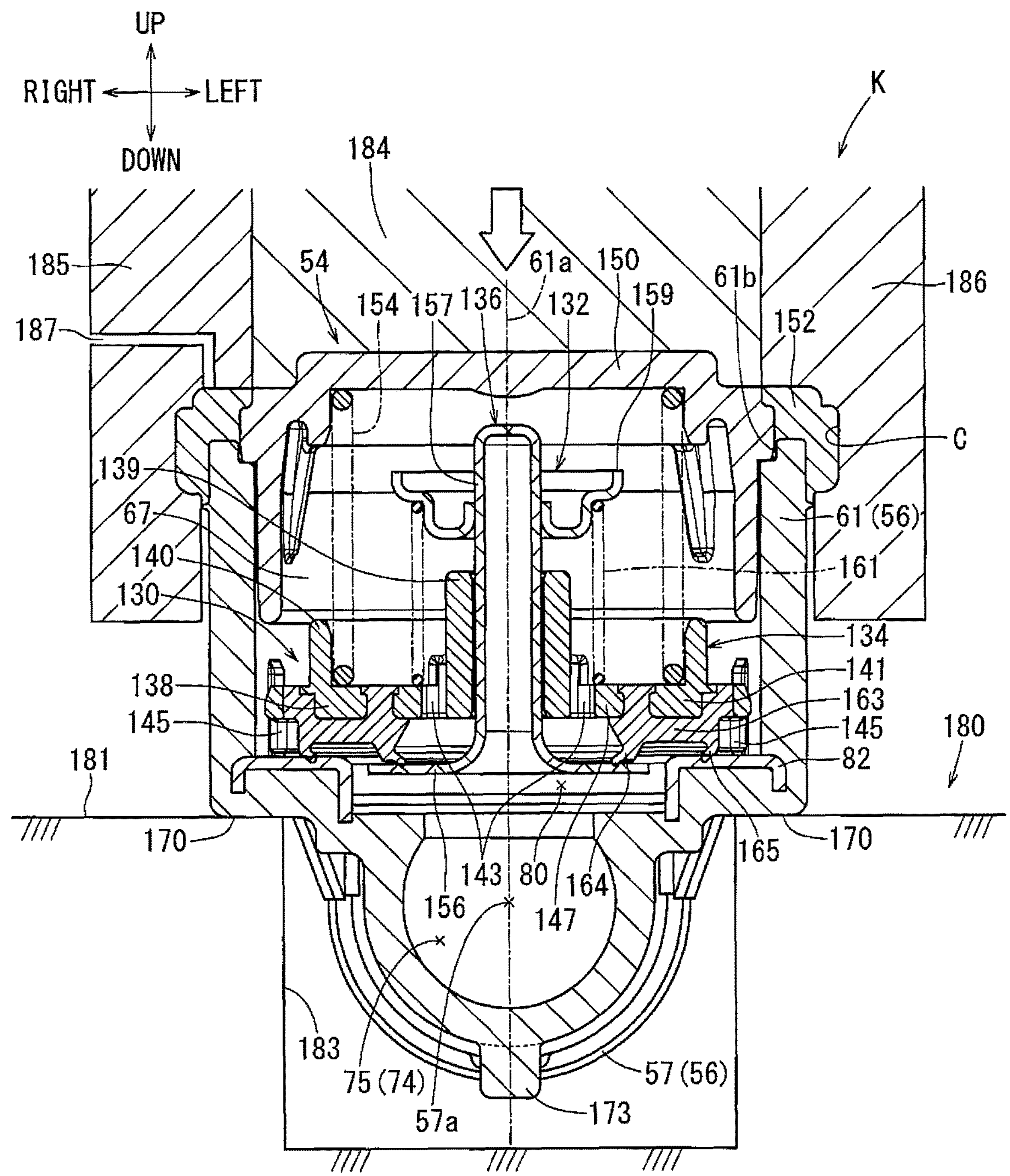
FIG. 10 is a cross-sectional view of the relief valve of FIG. 2 combined with a mold set for a connection member.

A mold set K for the connection member 152 will be described with respect to FIG. 10. The mold set K includes an upper mold 184, a right mold 185, and a left mold 186. The upper mold 184 is configured to move in the vertical direction. The right mold 185 and the left mold 186 are configured to move in the right-left direction. When the mold set K is assembled with the relief valve 54, a cavity C for the connection member 152 is formed. The right mold 185 has an injection port 187 connected to the cavity C. In this state, the second cylindrical compartment 61 of the valve casing 56 is mounted on the workbench 180 as described above.

During secondary molding process of the connection member 152, the cap 150 is attached to the second cylindrical compartment 61, and then the upper mold 184, the right mold 185 and the left mold 186 are moved to predetermined positions for molding the connection member 152. When the upper mold 184 is moved to the predetermined position, the cap 150 is pressed downward on the second cylindrical compartment 61. After the mold set K is assembled, a molten resin from an injector (not shown) is injected into the cavity C from the injection port 187. At this time, a downward load (shown by white arrow in FIG. 10) caused by injection pressure and backflow preventing pressure acts on the second cylindrical compartment 61. However, the flat surfaces 170 of the valve casing 56 are stably mounted on the workbench 180, so that inclination of the second cylindrical compartment 61 due to the downward load can be reduced or avoided.

After hardening the resin in the cavity C by cooling, the mold set K is disassembled, and the relief valve 54 is taken out. In this way, the connection member 152 is molded to couple the cap 150 with the second cylindrical compartment 61.

According to the first embodiment, both of the flat surfaces 170 of the valve casing 56 are supported on the workbench 180 during assembling the relief valve 54 and secondary molding of the connection member 152. This configuration suppresses inclination of the second cylindrical compartment 61 when the second cylindrical compartment 61 receives at least one of the pressing force on the cap 150, and when the injection pressure and the backflow preventing pressure for the molten resin act on the second cylindrical compartment 61. Thus, assembling workability of the relief valve 54 can be improved. As a result, positional displacement of the cap 150 during the assembling process can be suppressed so as to decrease errors in flow characteristic of the relief valve 54 due to manufacturing errors or the like.

In addition, the connection member 152 covers the whole peripheries of the second cylindrical compartment 61 and the cap 150. Thus, sealing performance between the second cylindrical compartment 61 and the cap 150 can be improved so as to decrease errors in flow characteristic of the relief valve 54 due to manufacturing errors or the like.

Figure 11:
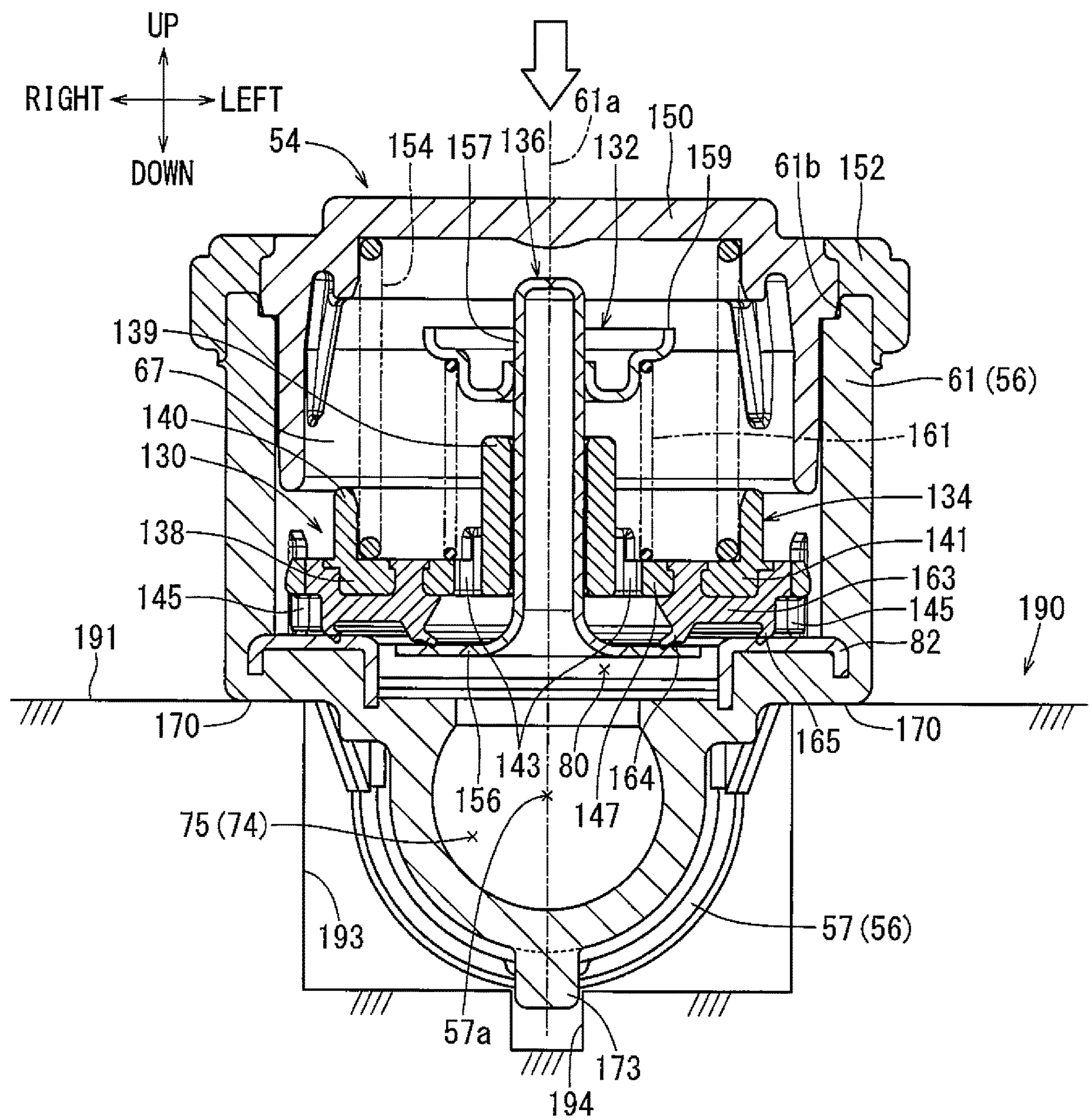
FIG. 11 is a cross-sectional view of a relief valve set on the workbench, according to a second embodiment.

A second embodiment will be described. The second embodiment is substantially the same as the first embodiment with some changes. Thus, while the changes will be described, same configurations will not be described in the interest of conciseness. As shown in FIG. 11, in the second embodiment, a workbench 190 is used instead of the workbench 180. The workbench 190 has an upper part 191, a groove part 193, and a concave part 194. The upper part 191 has an upper surface extending horizontally. The groove part 193 is recessed from the upper surface of the upper part 191 to extend in the front-rear direction. The groove part 193 is positioned at a central portion of the upper part 191 in the right-left direction. The groove part 193 is formed to have a square shape in a cross-section such that the part of the first pipe part 57 below the flat surfaces 170 can be substantially received in the groove part 193. The concave part 194 is recessed from a bottom of the groove part 193 to have a hollow cylindrical shape extending in the vertical direction. The concave part 194 is positioned at a central portion of the groove part 193 in the right-left direction. The concave part 194 is formed to engage with the projection 173 of the valve casing 56 when the relief valve 54 is set on the workbench 190.

According to the second embodiment, when the flat surfaces 170 of the second cylindrical compartment 61 are seated on the upper part 191 of the workbench 190, the part of the first pipe part 57 is disposed in the groove part 193 of the workbench 190 such that the projection 173 of the first pipe part 57 is engaged with the concave part 194. Thus, the valve casing 56 can be positioned in the axial direction of the first pipe part 57, i.e., in the front-rear direction. Therefore, it is able to improve workability in a state where the valve casing 56 is mounted on the workbench 190. In this disclosure, the projection 173 corresponds to “engaged part”. The concave part 194 corresponds to “engaging part”.

Figure 12:
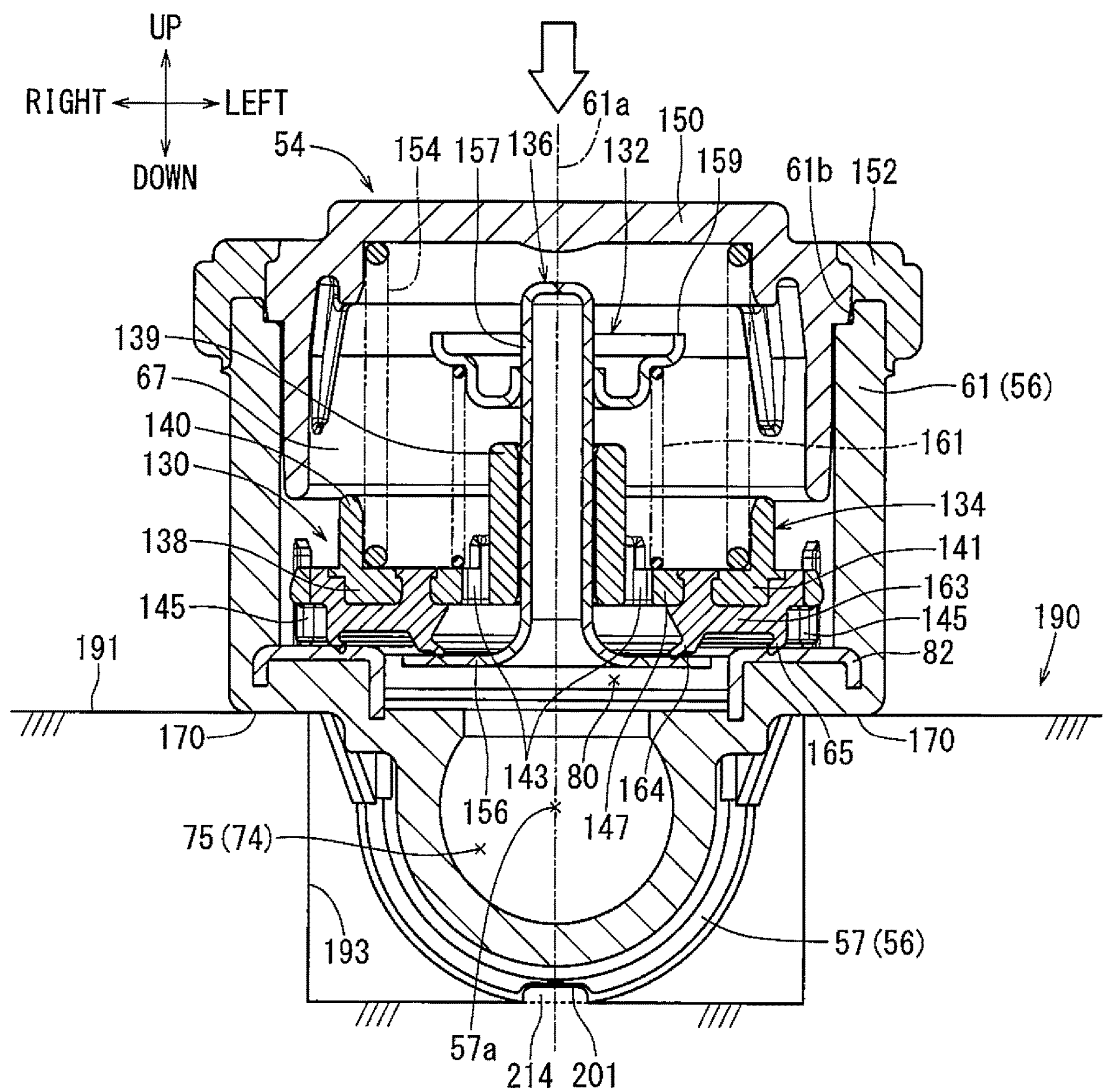
FIG. 12 is a cross-sectional view of a relief valve set on the workbench, according to a third embodiment.

A third embodiment will be described. The third embodiment is substantially the same as the second embodiment with some changes. Thus, while the changes will be described, same configurations will not be described in the interest of conciseness. As shown in FIG. 12, the valve casing 56 of the third embodiment has a concave part 201 instead of the projection 173. And, the workbench 190 has a convex part 214 instead of the concave part 194. The concave part 201 is formed at the bottom part of the first pipe part 57 in a hollow short cylindrical shape. The concave part 201 extends along the central axis 61*a* of the second cylindrical compartment 61. The convex part 214 is formed in a cylindrical shape protruding upward from the bottom surface of the groove part 193 of the workbench 190. The convex part 214 is positioned at a central portion of the groove part 193 in the right-left direction. The convex part 214 is shaped to mate and engage with the concave part 201 of the valve casing 56 when the relief valve 54 is set on the workbench 190.

According to the third embodiment, when the flat surfaces 170 of the second cylindrical compartment 61 are seated on the upper part 191 of the workbench 190, the part of the first pipe part 57 is disposed in the groove part 193 of the workbench 190 such that the concave part 201 of the first pipe part 57 is engaged with the convex part 214 of the workbench 190. Thus, the valve casing 56 can be positioned in the axial direction of the first pipe part 57, i.e., in the front-rear direction. Therefore, it is able to improve workability in a state where the valve casing 56 is mounted on the workbench 190. In this disclosure, the concave part 201 corresponds to “engaged part”. The convex part 214 corresponds to “engaging part”.

The present teaching is not limited to the above-described embodiments and can be modified variously. For example, the present teaching may be applied to various fluid control valves other than the relief valve 54.

The flat surfaces 170 may be formed at the first pipe part 57 instead of the second cylindrical compartment 61.

The flat surfaces 170 may be formed in an asymmetric manner in the right-left direction. The shape, such as size, of the flat surfaces 170 may be modified if necessary.

The engaging part and the engaged part only need to engage with each other, so that they can be modified variously. For example, one of the engaging part and the engaged part may formed in a square pole shape and the other may be formed in a hollow square pole shape. The engaged part may be formed at one of the flat surfaces 170. The valve casing 56 may have a plurality of engaged parts.

What is claimed is:

1. A fluid control valve, comprising:
a housing body including
a pipe part having a flow passage therein; and
a valve housing part including a valve chamber, a valve opening, a pair of flat surfaces and an open end, wherein the valve housing part has a central axis oriented perpendicular to a central axis of the pipe part such that the central axis of the valve housing and the central axis of the pipe part extend along a plane, the valve opening fluidly communicating the valve chamber with the flow passage, wherein the pair of flat surfaces are disposed on opposite sides of the plane, wherein each of the pair of flat surfaces extends perpendicularly toward the plane;
wherein the valve housing part comprises a cylindrical shape having a bottom wall and a top, wherein the bottom wall separates the pipe part from the valve housing part, wherein the open end is positioned on the top, wherein the pair of flat surfaces are positioned on the bottom wall, and wherein the valve opening passes through the bottom wall, between the pair of flat surfaces;
a valve member housed in the valve chamber and configured to open and close the valve opening;
a cap closing the open end of the valve housing part, wherein the open end is positioned axially between an upper most surface of the cap and the pair of flat surfaces with respect to the central axis of the valve housing part; and
a spring disposed between the valve member and the cap, wherein the spring biases the valve member toward the valve opening.

2. The fluid control valve according to claim 1, further comprising:
a secondary molded member made from a resin material and coupling the cap with the housing body in a non-removable manner.

3. The fluid control valve according to claim 2, wherein the secondary molded member has a ring shape and extends about an entire periphery of the cap and the valve housing part.

4. The fluid control valve according to claim 1, wherein the housing body includes an engaged part; and
wherein the engaged part is configured to engage with an engaging part of a workbench to prevent the fluid control valve from moving in an axial direction of the pipe part while the fluid control valve is mounted on the workbench.

5. The fluid control valve according to claim 4, wherein the engaged part has a convex shape protruding from the pipe part of the housing body.

6. The fluid control valve according to claim 4, wherein the engaged part has a concave shape recessed from a bottom surface of the pipe part.

7. The fluid control valve according to claim 4, wherein the engaged part is positioned on the central axis of the valve housing part.

8. The fluid control valve according to claim 1, wherein the open end of the valve housing part is oriented parallel to the central axis of the valve housing part.

9. The fluid control valve according to claim 1, wherein the valve housing part is concentric with the cap.

10. The fluid control valve according to claim 1, wherein both of the pair of flat surfaces extend along a plane oriented perpendicular to the central axis of the valve housing part.

11. The fluid control valve according to claim 1, wherein the pair of flat surfaces are mirror images of one another across the plane.

12. The fluid control valve according to claim 1, wherein each of the pair of flat surfaces extends toward the pipe part.

13. The fluid control valve according to claim 1, wherein the pair of flat surfaces connect the pipe part to the valve housing part.

14. A fluid control valve, comprising:
a housing body including
a pipe part having a flow passage therein; and
a valve housing part including a valve chamber, a valve opening, a pair of flat surfaces and an open end, wherein the valve housing part has a central axis oriented perpendicular to a central axis of the pipe part such that the central axis of the valve housing and the central axis of the pipe part extend along a plane, the valve opening fluidly communicating the valve chamber with the flow passage, wherein the pair of flat surfaces are disposed on opposite sides of the plane, wherein each of the pair of flat surfaces extends perpendicularly toward the plane and the pipe part;
wherein the valve housing part comprises a cylindrical shape having a bottom wall and a top, wherein the bottom wall separates the pipes part from the valve housing part, wherein the open end is positioned on the top, wherein the pair of flat surfaces are positioned on the bottom wall, and wherein the valve opening passes through the bottom wall, between the pair of flat surfaces;
a valve member housed in the valve chamber and configured to open and close the valve opening;
a cap closing the open end of the valve housing part; and
a spring disposed between the valve member and the cap, wherein the spring biases the valve member toward the valve opening.

15. The fluid control valve according to claim 14, wherein the pair of flat surfaces are positioned at a connection between the pipe part and the valve housing part.

16. The fluid control valve according to claim 15, wherein the open end is positioned axially between an upper most surface of the cap and the pair of flat surfaces with respect to the central axis of the valve housing part.

17. The fluid control valve according to claim 16, wherein the pair of surfaces are mirror images of one another across the plane.

* * * * *